United States Patent [19]
Klonikowski

[11] Patent Number: 5,413,826
[45] Date of Patent: May 9, 1995

[54] DETACHABLE MOTOR VEHICLE HOOD ORNAMENT

[76] Inventor: Guenter Klonikowski, Apt. 404 - 385 Queenston Road, Hamilton, Ontario, Canada, L8K 1J1

[21] Appl. No.: 901,302

[22] Filed: Jun. 19, 1992

[51] Int. Cl.[6] .............................................. B60R 13/04
[52] U.S. Cl. .................................. 428/31; 40/591; 280/727
[58] Field of Search ................ 428/31; 40/591; 280/727; D12/197

[56] References Cited

U.S. PATENT DOCUMENTS

| | | | |
|---|---|---|---|
| 2,570,983 | 10/1951 | Reilly | 428/31 |
| 3,968,977 | 7/1976 | Wilfert | 280/727 |
| 4,560,597 | 12/1985 | Kanamori | 428/31 |
| 4,913,941 | 4/1990 | Tedrahn | 280/727 X |
| 4,995,278 | 2/1991 | Huang | 40/591 X |
| 5,002,810 | 3/1991 | Birdwell et al. | 428/31 |

*Primary Examiner*—Henry F. Epstein
*Attorney, Agent, or Firm*—Patrick J. Hofbauer

[57] ABSTRACT

A hood ornament for mounting on a vehicle that allows an ornament member to be replaceably removable from the vehicle, is disclosed. The hood ornament comprises a replaceably removable ornament member that has an emblem portion with a first stem portion extending therefrom, and a base member having a second stem portion, wherein the base member is adapted to fixedly mount to the vehicle. A pair of pins extend from the first stem portion and fit into a pair of sockets in the second stem portion so as to frictionally engage the second stem portion, such that the first and second stem portions are securely yet releasably connected one to the other by way of the pins, thereby to allow said hood ornament member to be replaceably removable from said vehicle.

9 Claims, 1 Drawing Sheet

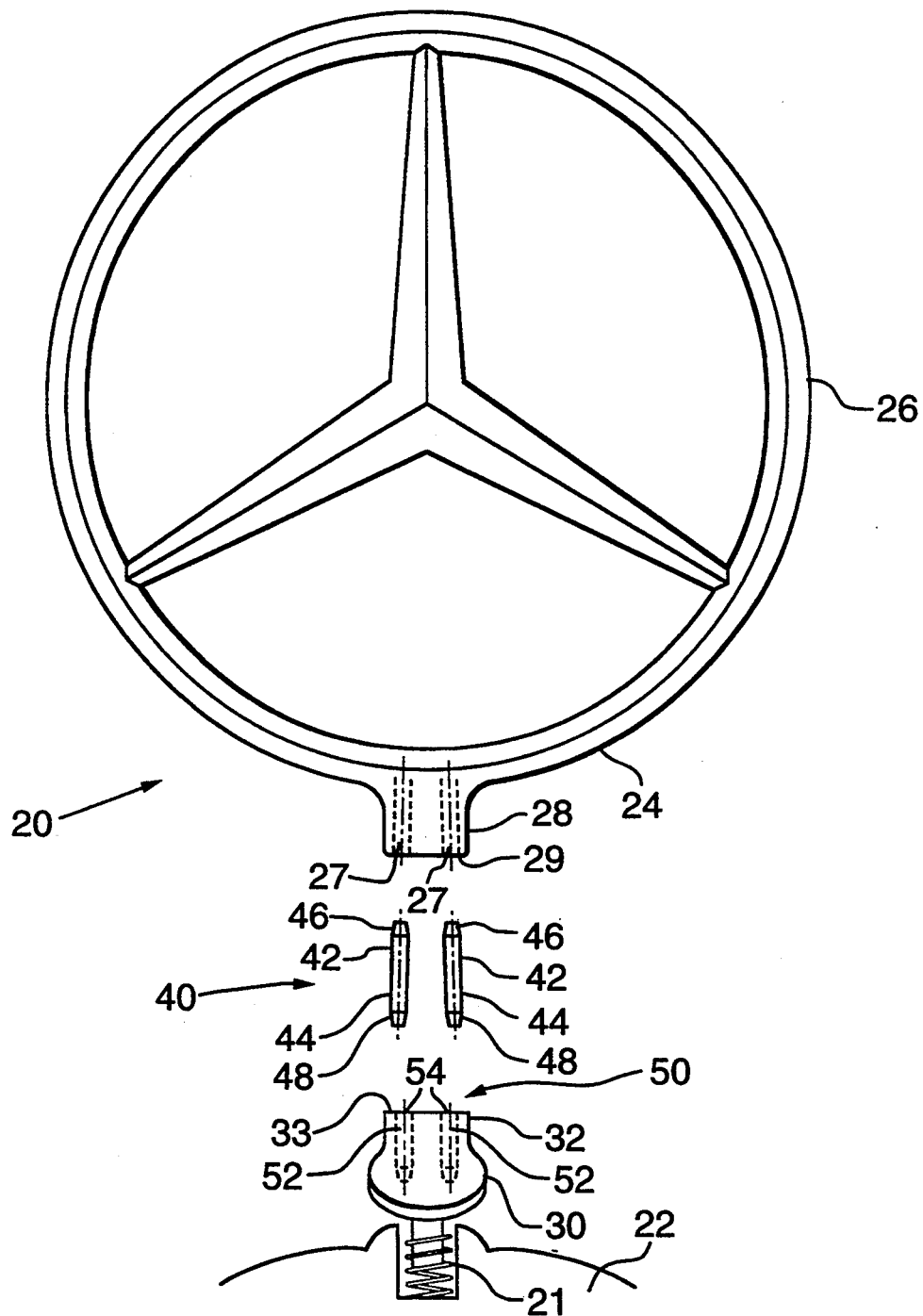
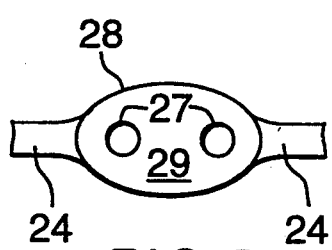
FIG.2
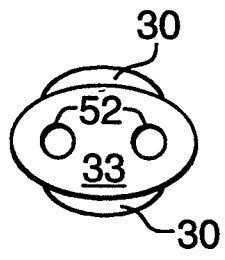
FIG.3

DETACHABLE MOTOR VEHICLE HOOD ORNAMENT

FIELD OF THE INVENTION

The present invention relates to hood ornaments for vehicles and more particularly to removable hood ornaments for vehicles.

BACKGROUND OF THE INVENTION

Many cars and trucks presently on the road and presently being produced by vehicle manufacturers have hood ornaments permanently attached by, for example, a spring attachment means at or near the front of the hood. These hood ornaments can easily be removed from the vehicle by forcibly pulling them off. Recently, hood ornaments have become popular targets for vandals and are being removed from cars at an alarming rate. It is not uncommon for an owner of a car, especially a prestigious car such as a Mercedes, Porsche, Cadillac, and so on, to have the hood ornament stolen several times in a year. At a cost of perhaps $50.00 to $100.00 per unit, it becomes quite expensive to continue to replace stolen hood ornaments. After several replacements, a vehicle owner might very well be inclined not to replace the hood ornament again, thus leaving the car in a less than ideal aesthetic state.

In order to preclude hood ornaments from being unwantedly removed from vehicles, there is needed a hood ornament that is easily removable from and replaceable onto its appropriate location on the hood area of a vehicle. Preferably, presently existing and installed hood ornaments would be adapted to be removable from and replaceable onto a vehicle.

Such removable and replaceable hood ornaments might, however, be inclined to be unwantedly removed from the vehicle by the flow of air encountered during driving, especially during high speed driving. Such unwanted removal is, of course, unsafe, and therefore unacceptable. Further, such a hood ornament might also be prone to loosening over a period of time with repeated removal and replacement.

In many countries, provinces, or states, there are regulations that call for hood ornaments to be flexibly mounted on a vehicle, such that the hood ornaments do not present a safety hazard in the event of a person contacting the hood ornament installed on the vehicle. It is important, therefore, that a removable and replaceable hood ornament still be flexibly mounted so as to be safe. Further, it is important that when the hood ornament is removed, a portion of the hood ornament remaining on the vehicle is safe, in terms of it being configured so as not to cause injury to a person who might happen to contact it.

SUMMARY OF THE INVENTION

It is an object of the present invention to produce a hood ornament that is easily removable from and replaceable onto a vehicle.

It is another object of the present invention to produce a removable mounting mechanism that easily adapts to well known hood ornaments.

It is yet another object of the present invention to produce a hood ornament that remains in place at high driving speeds.

It is yet another object of the present invention to produce a removable and replaceable hood ornament that will not loosen with repeated removing and replacing.

It is a further object of the present invention to produce a removable and replaceable hood ornament that utilizes already existing flexible mount means installed on vehicles.

It is yet a further object of the present invention to produce a removable and replaceable hood ornament that, when removed from a vehicle, does not have a portion thereof remaining on the hood of the car that might be unsafe if a person were to contact same.

A removable and replaceable hood ornament for mounting on a vehicle, is disclosed. The hood ornament comprises a replaceably removable ornament member having an emblem portion and a first stem portion extending therefrom with the first stem portion having an end surface and at least one orifice in the end surface, and a base member having a second stem portion, wherein the base member is adapted to fixedly mount to the vehicle. There is at least one interconnecting member affixed to and extending beyond a selected one of the first and second stem portions, each interconnecting member terminating in a first end portion. At least one receiving means is positioned within the other of the stem portion and dimensioned to frictionally engagingly receive the at least one interconnecting member. The first and second stem portions are securely yet releasably connectable one to the other by way of the interconnecting member so as to thereby allow the ornament member to be replaceably removable from the vehicle.

A method of re-manufacturing a vehicle hood ornament having an ornament member connected by a stem to a base member so as to render the hood ornament member replaceably removable from the base member, is disclosed. The method comprises the steps of:

cutting the stem so as to form a first stem portion projecting from the ornament member and a second stem portion projecting from the base member, each of the first and second stem portions having a respective mating end surface produced by the cutting;

forming one or more orifices in the end surface of a selected one of the first and second stem portions;

forming a corresponding number of sockets in the end surface of the other of the first and second stem portions, with the sockets being positionable in generally aligned axial register with respective ones of the one or more orifices upon mating of the end surfaces;

fixedly attaching at least one interconnecting member to the selected stem portion by press-fitting insertion thereof into respective ones of the one or more orifices, wherein the one or more interconnecting members are each adapted to securely yet releasably engage respective aligned ones of the corresponding number of sockets in the other stem portion;

the first and second stem portions being securely yet releasably connectable one to the other by way of the one or more interconnecting members, so as to permit a complete stem to be formed on a selective basis, and to thereby allow the ornament member to be replaceably removable from the base member.

Other objects, features and characteristics of the present invention, as well as methods of operation and functions of the related elements of the structure, and the combination of parts and economies of manufacture, will become more apparent upon consideration of the following detailed description and the appended claims with reference to the accompanying drawings, all of which form a part of this specification.

BRIEF DESCRIPTION OF THE DRAWINGS

FIG. 1 of the drawings appended hereto is an exploded elevational view of a separable hood ornament according to the preferred embodiment of the present invention;

FIG. 2 of the drawings is a bottom view of the replaceably removable ornament member of the separable hood ornament of FIG. 1; and, FIG. 3 of the drawings is a top view of the base member of the separable hood ornament of FIG. 1.

DETAILED DESCRIPTION OF A PREFERRED EMBODIMENT

Referring now to FIGS. 1 through 3 of the drawings, a separable hood ornament 20 of the present invention, which is designated by the general reference numeral 20, is shown. The separable hood ornament 20 is ready for mounting on a vehicle 22. The hood ornament 20 comprises a replaceably removable ornament member 24 and a base member 30. The replaceably removable ornament member 24 has an emblem portion 26 and a first stem portion 28 extending downwardly therefrom that terminates in a first end surface 29. The first stem portion 28 has a pair of orifices 27 that are open at the first end surface 29 thereof.

The base member 30 has a second stem portion 32 extending upwardly therefrom that terminates in a second end surface 33, wherein the base member 30 is adapted to fixedly mount to the vehicle 22 by way of a spring mounting means 21. Positioned within the second stem member 32 is a receiving means, which is designated by the general reference numeral 50, made from hardened steel, in the form of a pair of generally parallel sockets 52 that have open ends 54 at the second end surface 33 thereof.

There is at least one interconnecting member, which is designated by the general reference numeral 40, in the form of a pair of pins 42, with the pins 42 being received in tight fitting relation in the orifices 27. The pins 42 are preferably press fit into the orifices 27 so that the second end portions 46 of the pins 42 are securely retained within the orifices 27 so as to remain therein when the ornament member 24 is removed from the base member 30. The first end portions 44 of the pins 42 extend beyond the first end surface 29 of the first stem portion 28.

The pins 42 are preferably made of elastically flexible carbon spring steel so that even though they are splayed at an angle of about 2° to about 3°, the first end portions 44 may readily engage the generally parallel sockets 52. Such elastic flexibility also provides a biasing force against the side walls of the sockets 52, such that the pins 42 are more tightly frictionally engaged therein.

The sockets 52 in the receiving means 50 are dimensioned and positioned to receive the pair of pins 42 in tightly held removable relation, with the sockets 52 being preferably dimensioned to frictionally engage the pins 42.

Preferably, the pins 42 are splayed with respect to one another at an angle of about 2° and about 3° relative to each other, so as to allow the pins 42 to engage the sockets 52 more snugly as previously outlined. The centre-to-centre distance between the first end portions 44 is, therefore, slightly greater than the centre-to-centre distance between the sockets 52. This difference has been exaggerated in FIG. 1 for ease of illustration. The first end portions 44 preferably have chamfered surfaces 48 to allow the open ends 54 of the sockets 52 to align the pins 42 with the sockets 52.

The replaceably removable ornament member 24 is removed from a vehicle hood by reasonably forcibly pulling upwardly thereon. Once removed, the replaceably removable ornament member can be carried about in a pocket, or kept in any suitable safe place.

In order to replace the replaceably removable hood ornament 24, the first end portions 44 of the pins 42 are placed at the sockets 52. A portion of the material that defines the open ends 54 of the sockets 52 comes into intimate contact with the chamfered surfaces 48 of the pins 42, thus causing alignment of the pins 42 with the sockets 52. Such alignment by the ends 54 of the sockets 52 is necessary if the pins 42 are splayed with respect to each other at an angle of about 2° to about 3°. Once the pins 42 are aligned with the sockets 52, the replaceably removable ornament member 24 is pushed downwardly until the first end surface 29 of the first stem portion 28 is abutted against the second end surface 33 of the second stem portion 32.

A method of re-manufacturing a vehicle hood ornament having an ornament member connected by a stem to a base member so as to render the hood ornament member replaceably removable from the base member, will now be described. The method comprises the following steps.

The stem of a vehicle hood ornament is cut across its width so as to form the first stem portion 28 projecting from the ornament member 24 and the second stem portion 32 projecting from the base member 30. Such cutting produces the respective first 29 and second 33 end surfaces. The two orifices 27 are formed, preferably by drilling, in the first end surface 29 of the first stem portion 28. The two sockets 52 are formed, preferably by drilling, in the end surface 33 of the second stem portion 32, such that each of the sockets 52 is positionable in generally aligned axial register with the respective one of the orifices 27.

The second end portions 46 of the pins 42 are introduced into the first stem portion 28, preferably by press fitting, until they are received in tight fitting relation therein and are fixedly attached thereto. After such attachment, the pins 42 are each adapted to securely yet releasably engage the respective aligned sockets 52 in the second stem portion 32.

When the replaceably removable ornament member 24 is to be replaced on the hood 22 of a vehicle, the first end portions 44 of the pins 42 are introduced into the sockets 52, wherein the pins 42 are adapted to securely yet releasably engage the second stem portion 32. Such replacement permits a complete stem to be formed on a selective basis, to thereby allow the ornament member 24 to be replaceably removable from the base member 30.

In an alternative embodiment of the present invention (not illustrated), it is contemplated that the pins and the sockets could be integrally formed parts of the replaceably removable ornament member.

In another alternative embodiment of the present invention (not illustrated), it is contemplated that the pins could be slightly curved and elastically flexible so as to provide additional biasing force against the sockets.

In a further alternative embodiment of the present invention (not illustrated), it is contemplated that each of the sockets in the second stem portion be formed oversize and have a reinforcing sleeve press-fit therein. The reinforcing sleeve would be made of a harder material such as hardened steel and would be configured and dimensioned to receive the pins from the first stem member therein in tightly held removable relation.

I claim:

1. A hood ornament for mounting on a vehicle, said hood ornament comprising:

a replaceably removable ornament member having an emblem portion and a first stem portion extending therefrom with said first stem portion having an end surface and at least one orifice in said end surface;

a base member having a second stem portion, said base member being adapted to be fixedly mounted to said vehicle;

at least one interconnecting member affixed to and extending beyond a selected one of said first and second stem portions with each interconnecting member terminating in a first free end portion;

at least one receiving means positioned with the other of said stem portions and dimensioned to frictionally engagingly receive said free end portion;

said first and second stem portions being securely, yet releasably, connectable one to the other by way of said at least one interconnecting member so as to thereby allow said ornament member to be replaceably removed from said vehicle.

2. The hood ornament of claim 1, wherein said at least one interconnecting member is a pin, wherein said receiving means comprises a socket recessed within the second stem portion, which socket is dimensioned and positioned to receive said pin in a tightly held removable relationship.

3. The hood ornament of claim 1, wherein said at least one interconnecting member comprises a pair of pins, wherein said receiving means comprises a corresponding plurality of sockets recessed within the second stem portion, and wherein said sockets are dimensioned and positioned to receive said pair of pins in a tightly held removable relationship.

4. The hood ornament of claim 3, wherein each of said pair of pins is elastically flexible and wherein each of said pins is splayed with respect to the other of said pins thereby to provide a biasing force against said sockets when said pins are retained within said sockets, such that said pins are more tightly frictionally engaged within said sockets.

5. The hood ornament of claim 4, wherein said pins are made from carbon spring steel.

6. The hood ornament of claim 5, wherein said first free end portion of each of said pins is chamfered so as to allow for easy insertion of said pins into said sockets.

7. The hood ornament of claim 6, wherein said sockets are formed in hardened steel so as to preclude deformation of said sockets over a period of time.

8. The hood ornament of claim 7, wherein said first and second pin members are splayed with respect to one another at an angle between about 2° and about 3°.

9. The hood ornament of claim 8, wherein said pins are press fit into said ornament member.

* * * * *